(12) United States Patent
Khonsarian et al.

(10) Patent No.: US 12,243,324 B2
(45) Date of Patent: Mar. 4, 2025

(54) VISUAL GUIDANCE SYSTEM AND METHOD

(71) Applicant: Correct-AI Inc., Edmonton (CA)

(72) Inventors: Roya Khonsarian, Edmonton (CA); Amin Nazarzadeh Oghaz, Edmonton (CA); Bruce McGregor Alton, Edmonton (CA); Siamak Akhlaghi Esfahany, Edmonton (CA)

(73) Assignee: Correct-AI Inc., Edmonton (CA)

( * ) Notice: Subject to any disclaimer, the term of this patent is extended or adjusted under 35 U.S.C. 154(b) by 617 days.

(21) Appl. No.: 17/446,099

(22) Filed: Aug. 26, 2021

(65) Prior Publication Data
US 2022/0067403 A1 Mar. 3, 2022

Related U.S. Application Data

(60) Provisional application No. 63/071,665, filed on Aug. 28, 2020.

(51) Int. Cl.
| | |
|---|---|
| *G06K 9/00* | (2022.01) |
| *G05D 1/00* | (2006.01) |
| *G06F 18/25* | (2023.01) |
| *G06T 7/246* | (2017.01) |
| *G06V 20/58* | (2022.01) |

(52) U.S. Cl.
CPC ........... *G06V 20/58* (2022.01); *G05D 1/0214* (2013.01); *G06F 18/251* (2023.01); *G06T 7/248* (2017.01); *G05D 1/027* (2013.01); *G05D 1/0278* (2013.01); *G06T 2207/10028* (2013.01); *G06T 2207/30261* (2013.01)

(58) Field of Classification Search
None
See application file for complete search history.

(56) References Cited

U.S. PATENT DOCUMENTS

| | | |
|---|---|---|
| 6,678,590 B1 | 1/2004 | Burchfiel |
| 8,315,789 B2 | 11/2012 | Dunbabin |
| 9,165,196 B2 | 10/2015 | Kesavan et al. |

(Continued)

FOREIGN PATENT DOCUMENTS

| | | |
|---|---|---|
| CN | 103253263 B | 6/2016 |
| CN | 106891889 A | 6/2017 |

(Continued)

*Primary Examiner* — Wei Wen Yang
(74) *Attorney, Agent, or Firm* — Bennett Jones LLP

(57) ABSTRACT

A visual guidance system for a vehicle includes an imaging system for producing a digital image of an environment, a three-dimensional scanning system for producing a digital point cloud of the environment, and a memory storing instructions executable by a processor to: process the digital image to detect an object and classify the object; process the point cloud to group points into a grouping representing the object; fuse the point cloud grouping with the digital image object to produce a fused data set frame, and determine the object location from the fused data set frame; determine an object velocity relative to the vehicle by comparing the fused data set frame to a previous data set frame; determine whether the object is an obstacle based on the object location and relative velocity; determine a threat level of the obstacle; and report a threat if the threat level exceeds a threshold.

18 Claims, 13 Drawing Sheets

(56) References Cited

U.S. PATENT DOCUMENTS

| | | |
|---|---|---|
| 9,603,300 B2 | 3/2017 | Pettersson |
| 9,989,967 B2 | 6/2018 | Jacobus et al. |
| 10,071,676 B2 | 9/2018 | Schofield |
| 10,255,670 B1 | 4/2019 | Wu et al. |
| 10,310,087 B2 | 6/2019 | Laddha et al. |
| 10,489,686 B2 | 11/2019 | Vallespi-Gonzalez |
| 10,493,910 B2 | 12/2019 | Boyle |
| 2014/0037136 A1 | 2/2014 | Ramalingam et al. |
| 2017/0124781 A1* | 5/2017 | Douillard ............... G08G 1/207 |
| 2018/0060725 A1 | 3/2018 | Groh et al. |
| 2019/0120965 A1 | 4/2019 | Choiniere |
| 2019/0146511 A1 | 5/2019 | Hurd et al. |
| 2019/0171912 A1 | 6/2019 | Vallespi-Gonzalez et al. |
| 2019/0179327 A1 | 6/2019 | Martin et al. |
| 2019/0213426 A1 | 7/2019 | Chen et al. |
| 2019/0382007 A1 | 12/2019 | Casas et al. |
| 2020/0355820 A1* | 11/2020 | Zeng ................. G01S 13/865 |

FOREIGN PATENT DOCUMENTS

| | | | |
|---|---|---|---|
| CN | 107957583 A | 4/2018 | |
| CN | 108255189 A | 7/2018 | |
| CN | 108297098 A | 7/2018 | |
| CN | 108555911 A | 9/2018 | |
| CN | 105843229 B | 12/2018 | |
| CN | 110221610 A | 9/2019 | |
| CN | 110315545 A | 10/2019 | |
| CN | 110850884 A | 2/2020 | |
| CN | 106950952 B | 4/2020 | |
| ES | 2880930 T3 * | 11/2021 | ............ B65D 88/12 |
| IN | 2013MU02929 A | 9/2013 | |
| IN | 201841020340 A | 7/2018 | |
| JP | 3740883 B2 | 2/2006 | |
| KR | 20130118116 A | 10/2013 | |
| KR | 20150142475 A | 12/2015 | |
| KR | 101719127 B1 | 3/2017 | |
| KR | 20190106927 A | 9/2019 | |
| WO | 2019056881 A1 | 3/2019 | |

\* cited by examiner

VISUAL GUIDANCE SYSTEM AND METHOD

CROSS-REFERENCE TO RELATED APPLICATION

This application claims the priority benefit of U.S. Provisional Patent Application No. 63/071,665 filed on Aug. 28, 2020, the entire contents of which are incorporated herein by reference.

FIELD OF THE INVENTION

The present invention relates to a vehicular system and method for detecting, classifying and avoiding obstacles in real time, as well as reporting the ground slope change and/or road condition.

BACKGROUND OF THE INVENTION

Driver assistance and automated control systems for vehicles require obstacle detection and avoidance strategies. Existing solutions suffer from high computational power requirements, difficulty with low-light environments, low discrimination thresholds, low accuracy and high latency. In order to maintain high safety standards, a high rate of false positives are tolerated.

There is a need in the art for a visual guidance system and method which may mitigate at least some of the difficulties of the prior art.

SUMMARY OF THE INVENTION

In one aspect, the invention may comprise a visual guidance system for a vehicle in an environment. The visual guidance system comprises:
  (a) an imaging system for producing a digital image of the environment, and a three-dimensional scanning system for producing a digital point cloud of the environment;
  (b) a processor and a memory, the memory storing instructions executable by the processor to:
    (i) process the digital image to detect an object and classify the object;
    (ii) process the point cloud to group points into a grouping which represents the object;
    (iii) fuse the point cloud grouping with the digital image object to produce a fused data set frame, and determine an object location from the fused data set frame;
    (iv) determine an object velocity relative to the vehicle by comparison of the fused data set frame to a previous fused data set frame;
    (v) determine whether the object is an obstacle based on the object location and the object velocity relative to the vehicle;
    (vi) determine a threat level of the obstacle, if any; and
    (vii) report a threat if any, for which the threat level exceeds a predetermined threshold.

In some embodiments, the system may further comprise an inertial measurement unit, and optionally a global navigation satellite system unit.

In some embodiments, the object detected in the digital image may be classified as a predetermined object to be avoided, such as a person, another vehicle, or a structure such as a pipeline, building, or wellhead.

In some embodiments, the point cloud and/or the digital image is processed to determine elevation information in order to detect ground level and/or grade.

In some embodiments, the system may further comprise a user display which depicts the environment and any objects or obstacles within the environment. Preferably, the threat level of any object or obstacle is displayed.

In some embodiments, the system may comprise an incident logging/reporting component which records the detection of an object or obstacle, and periodically or continuously reports detection events to a remote user. Preferably, the logging/reporting component stores an image of an object or obstacle and/or an absolute position map, linked to the incident record to be accessed by the remote user.

In another aspect, the invention may comprise a method of guiding a vehicle in an environment, comprising:
  (a) obtaining a digital image and producing a point cloud of the environment;
  (b) processing the digital image to detect an object and classify any object detected;
  (c) processing the point cloud to group points into a grouping which represents the object;
  (d) fusing the point cloud grouping with the digital image object to produce a fused data set frame, and determining an object location from the fused data set frame;
  (e) determining an object velocity relative to the vehicle by comparison of the fused data set frame to a previous fused data set frame;
  (f) determining whether the object is an obstacle based on the object location and the object velocity relative to the vehicle; and
  (g) determining a threat level of the obstacle, if any.

In some embodiments, the method may comprise the further step(s) of (h) reporting the threat level of the obstacle, if any, to a vehicle operator or user, and/or (i) recording the threat level of the obstacle, if any, to a data log, which may comprise one or more of:
  (a) a date and time stamp;
  (b) a type of the obstacle;
  (c) a distance of the obstacle to the vehicle;
  (d) a vehicle location; and
  (e) the digital image.

In some embodiments, the method may further comprise the step of determining a vehicle velocity and location.

In some embodiments, the object detected in the digital image may be classified as a predetermined object to be avoided.

In some embodiments, the method may further comprise the step of determining elevation information in order to detect ground level and/or grade.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Figure 1A:
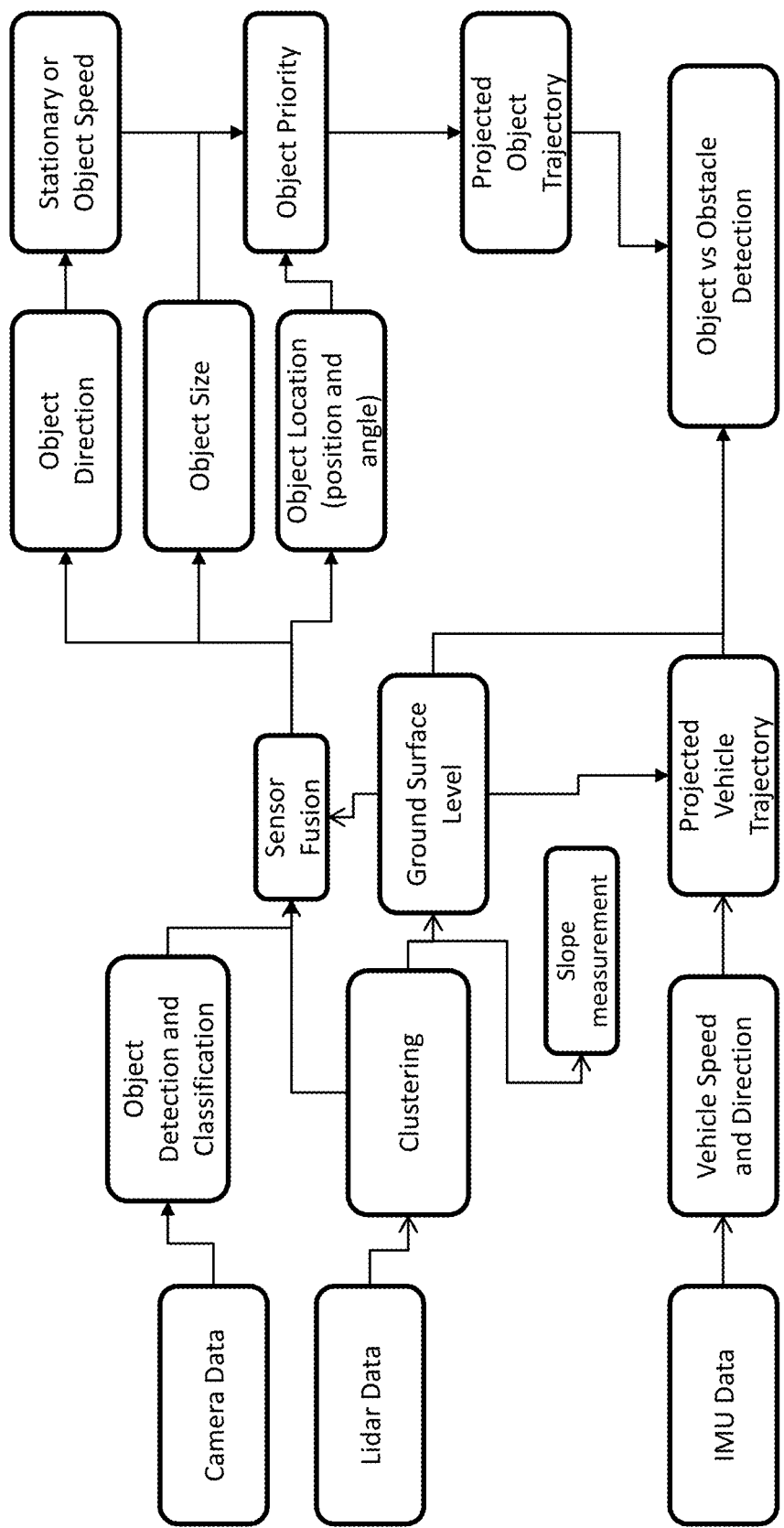
FIG. 1A shows a flowchart schematically depicting one embodiment of an obstacle avoidance strategy in a vehicle guidance method.

Any term or expression not expressly defined herein shall have its commonly accepted definition understood by a person skilled in the art. As used herein, the following terms have the following meanings.

A "vehicle" is any mobile, self-propelled device for transporting people or things or for any industrial purpose. In preferred embodiments, the vehicles of the present invention comprise industrial equipment such as trucks, loaders, graders, bulldozers, skid steers, excavators, forklifts, pipelayers, seismic vibrators, tractors, locomotives and the like.

An "object" is any physical object which can be detected by a system or method of the present invention. An "obstacle" is an object which is predicted to collide with a vehicle, or where there is a probability of collision with the vehicle, if both the object and the vehicle maintain their current speed and direction of movement. An object's "trajectory" is the path that the object will follow through space, as a function of time.

The velocity of an object is the rate of change of its position with respect to a frame of reference, and is a function of time. Velocity is equivalent to a specification of an object's speed and direction of motion. The velocity of an object may be determined relative to the vehicle, and can be determined without any information about the vehicle's velocity. Thus, the object's relative velocity may indicate a probability of collision if the object is stationary and the vehicle is moving, or if the vehicle is stationary and the object is moving, or if both object and vehicle are moving.

An "environment" is the surroundings of the vehicle which may include objects and obstacles.

"Processor" refers to one or more electronic devices that is/are capable of reading and executing instructions stored on a memory to perform operations on data, which may be stored on a memory or provided in a data signal. The term "processor" includes a plurality of physically discrete, operatively connected devices despite use of the term in the singular. Non-limiting examples of processors include devices referred to as microprocessors, microcontrollers, central processing units (CPU), and digital signal processors.

"Memory" refers to a non-transitory tangible computer-readable medium for storing information in a format readable by a processor, and/or instructions readable by a processor to implement an algorithm. The term "memory" includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

System.

A system of the present invention is intended to be mounted to a vehicle operating in an environment that includes objects which may be obstacles, and therefore presents collision or rollover risks. The system implements computer vision to detect and classify objects, relative velocity of objects, and determine the threat level of objects in the environment. The system may determine relative distance between vehicles, or between a vehicle and an object, for safe and efficient operation. Implementation of computer vision may assist with operation speed, resulting from an increase of efficiency as a result of less frequent stops for false positives or a better visibility. Exemplary implementations include industrial machinery operating in an earth moving or industrial setting. For example, the vehicle may be a front-end loader or an excavator operating in a construction site.

Figure 2:
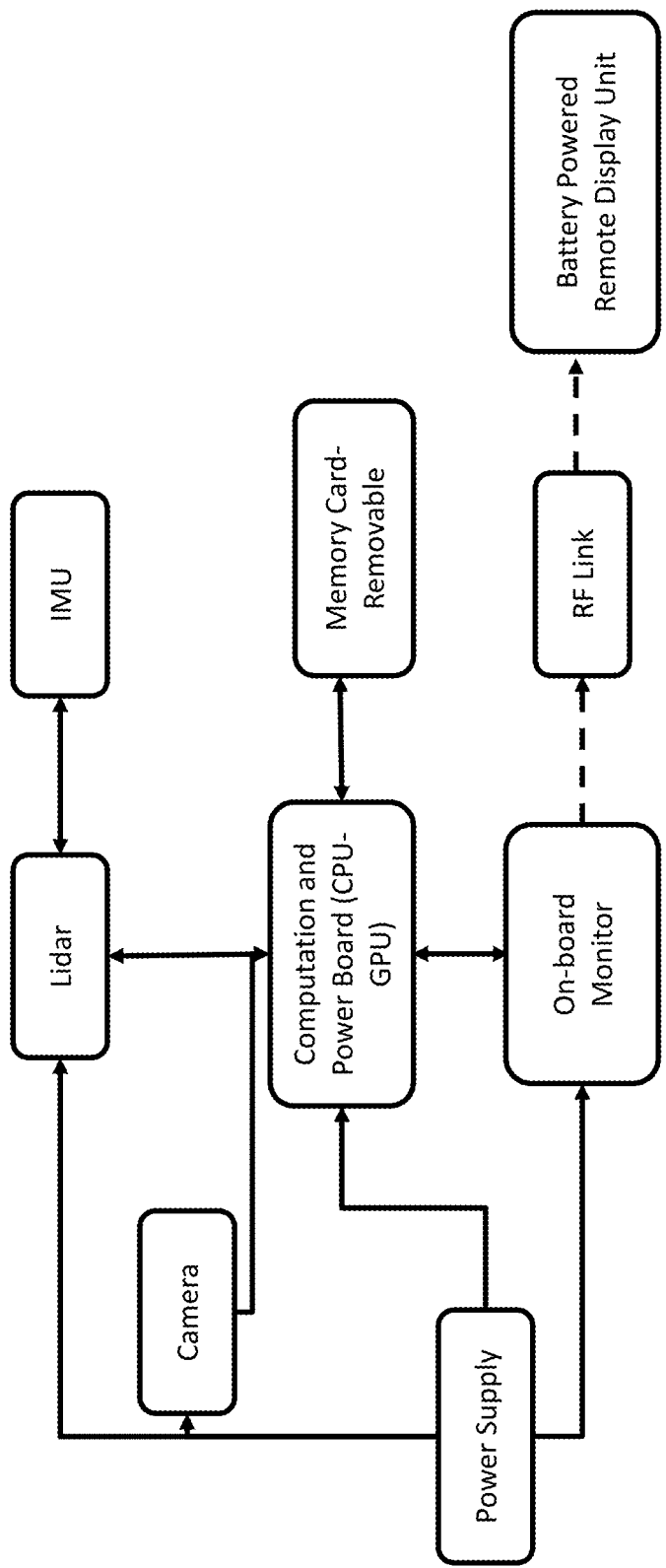
FIG. 2 shows a schematic configuration of one embodiment of a visual guidance system for a vehicle.
Figure 3:
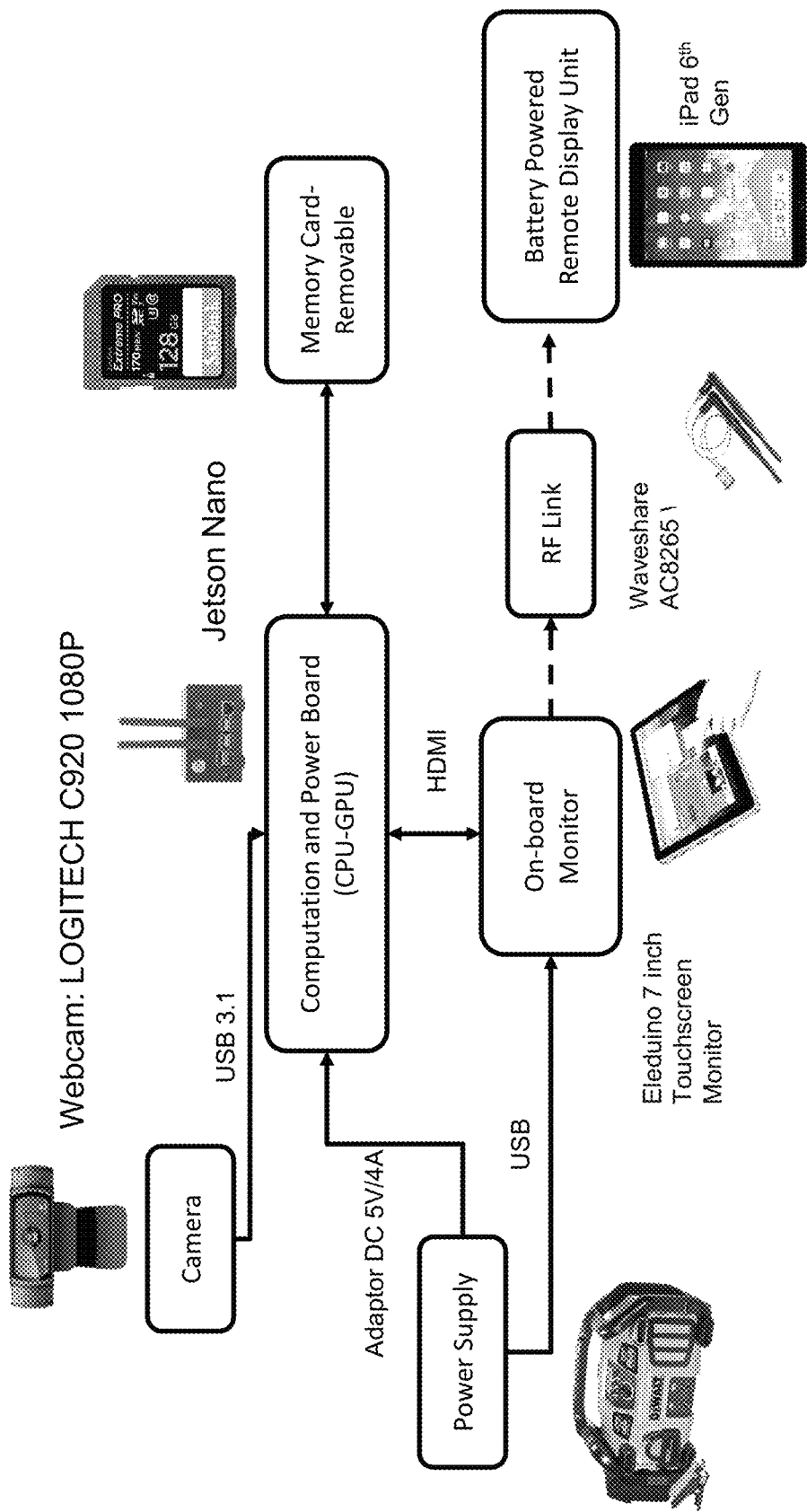
FIG. 3 shows a shows a schematic configuration of an alternative embodiment of a visual guidance system for a vehicle.

In one embodiment, as shown in FIGS. 2 and 3, a vehicular visual guidance system comprises a vehicle-mounted imaging system for producing a digital image of the environment and a three-dimensional scanning system for producing a point cloud of the environment. The digital imaging system may comprise any suitable digital camera which produces digital pixelated images. The scanning system may comprise any suitable laser scanning system which produces a point cloud, wherein each point is characterized by an X, Y and Z coordinate value, and reflected light intensity. Preferably, the imaging system and 3-D scanning system are mounted in a forward position to image and scan the environment in a forward direction of the vehicle, or backward position to eliminate blind spots in the reverse mode of vehicle operation.

In some embodiments, the vehicle may include a system to monitor and report its location, speed and direction of movement, such as an inertial measurement system, which comprises at least two and preferably three accelerometers, which can measure the vehicle's acceleration and velocity without reference to its geolocation. The inertial measurement system may include gyroscopes that would determine the direction of the movement. The system preferably includes a GPS system which geolocates the vehicle and can also report information about the vehicle's velocity. Some or all of these system outputs may be used to determine the vehicle's current and predicted trajectory. In some embodiments, the vehicle includes a user interface such as a monitor or display screen for displaying information to a vehicle operator. The user interface may also include an input device such as a touchscreen monitor. The user interface may also include speakers to produce auditory information or alerts. In some preferred embodiments, a link to a remote display unit may also be provided, such as a RF, Bluetooth, Wifi, or cellular connection.

The imaging system, 3-D scanning system, and vehicle location and velocity sensors provide inputs into a control system, which comprises a computation and power board including a processor. The processor executes instructions stored on a memory to implement the methods of the present invention, as described herein. The processor and memory may each comprise one or a plurality of physically discrete component(s). The component(s) of the processor and memory may be either onboard the vehicle, or located remotely from the vehicle (e.g., by application of "cloud computing" systems, and distributed computing systems), or some components may be onboard the vehicle while other components may be located remotely from the vehicle. Accordingly, the present invention is not limited by the location of the components of the processor or memory, or where processing steps are performed in relation to the vehicle. A power supply may be connected to the vehicle's onboard power supply, such as a battery and/or generator. The voltage and wattage may be varied as required for the different components of the system. The connections between the components, which may transmit data and/or instructions, may comprise standard wired connection protocols, such as USB, HDMI, Ethernet, or wireless protocols such as Wifi, Bluetooth, LTE, 5G and the like.

Method.

Referring to FIG. 1A, in operation, the imaging system scans an area of interest around the vehicle, in or adjacent the vehicle's intended path, or attachments to the vehicle. The camera periodically or continuously provides a digital image while the laser scanning system periodically or continuously provides a three-dimensional digital point cloud.

The digital image is processed to detect objects, using an object detection component which operates standard object detection algorithms, and preferably the objects are at least partially classified using shape recognition. For example, the system may be configured with machine learning algorithms to detect and classify certain objects, such as humans, vehicles, pipelines, buildings, wellheads, wildlife or other objects which must be avoided. In order to reduce processing requirements, other objects need not be classified.

The point cloud is processed to detect objects by grouping (also referred to as clustering) points into at least one or more groups (also referred to as clusters), with each group (cluster) representing an object. Optionally, the system may be configured with machine learning algorithms to classify objects from the clustered point groups, in addition to or instead of the shape recognition and machine learning applied to the digital images.

In some embodiments, the point cloud is further processed to create a depth map from which distance to the object (object location) can be determined. Also, the point cloud may be further processed to determine elevation information in order to detect ground level and the horizon, which enables determination of road curvature or edge. Alternatively, elevation information may be derived from the digital image, but it is more easily and accurately derived from the point cloud. The ground level may also allow determination of slope, as compared to a horizontal level ground. Slope and/or road edge determination may be used to identify "no-go" zones for the vehicle, which are then treated like obstacles, to be avoided.

Roll and pitch angle generated from the inertial measurement units, along with location data from global navigation satellite system, may help to determine soft spots on the road.

Figure 5:
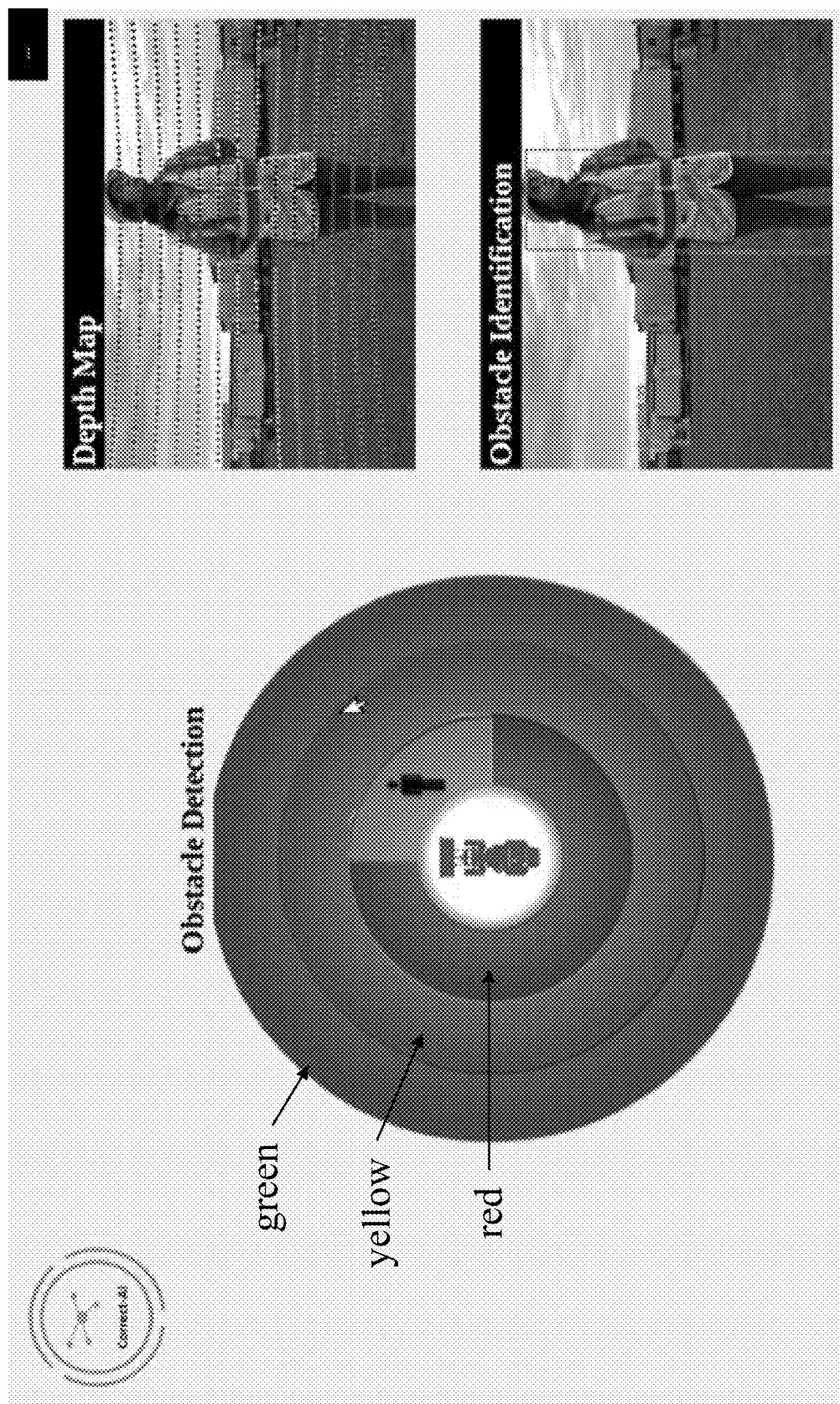
FIG. 5 shows a schematic depiction of a user display, a digital image with obstacle identification, and a depth map, with a human obstacle.

The point cloud clusters may then be fused with the digital image objects, and from the fused data, the object's location and size may then be determined from the fused data. As used herein, "fusing" a point cloud group and a digital image object refers a process whereby data defining the point cloud group and the data defining digital image object are associated with each other based on matching features in the digital point cloud values and digital image pixels. As shown in FIG. 5, the fused data shows an obstacle, classified as a person which is in proximity to the vehicle. The depth map shows the relative close proximity (i.e., distance of the object to the vehicle) and elevation.

Successive frames of fused data may be used to estimate the object's velocity relative to the vehicle. The refresh rate should preferably allow real-time estimation. For example, the refresh rate can be between about 1 ms to about 100 ms (about 10 Hz to about 1000 Hz).

Figure 4:
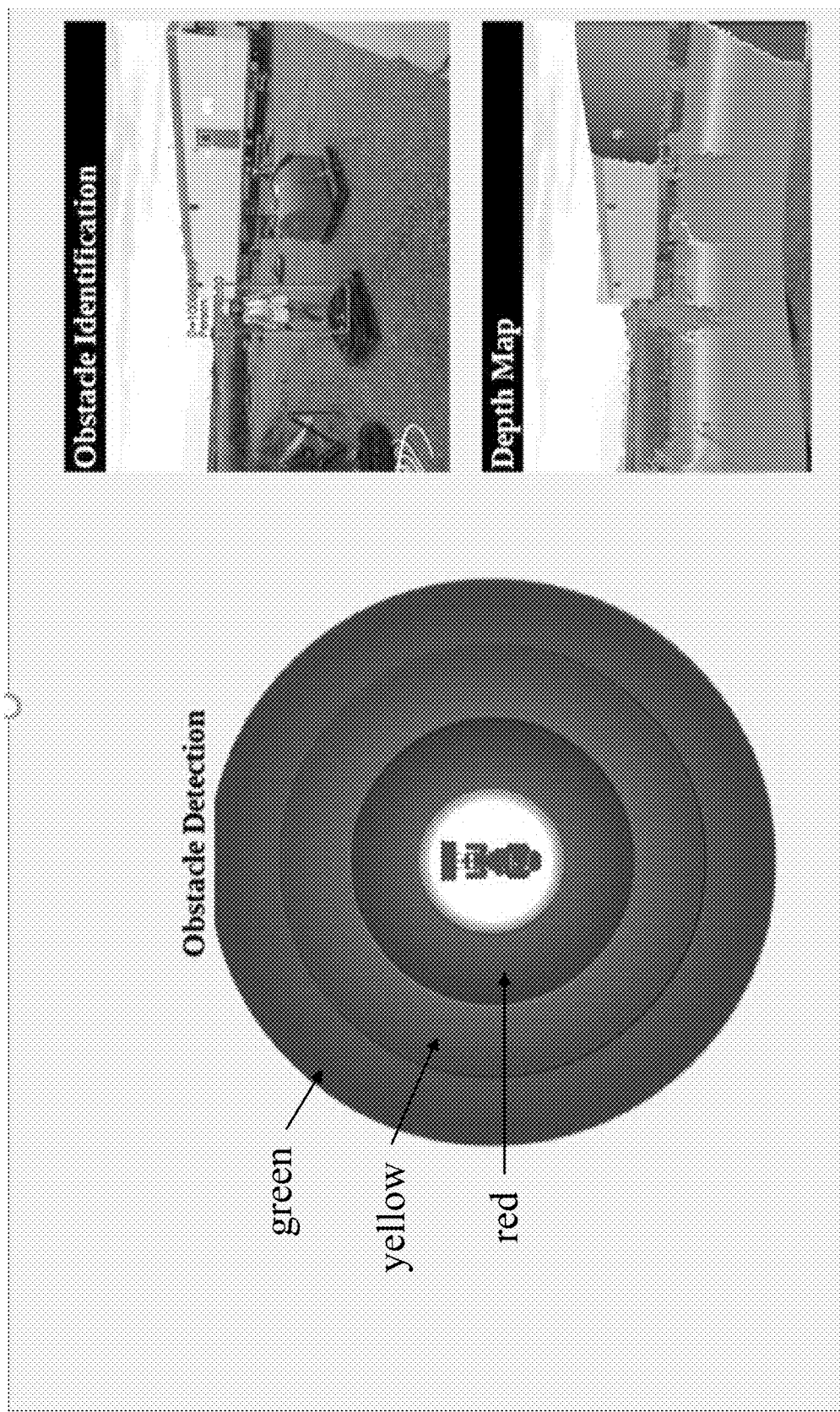
FIG. 4 shows a schematic depiction of a user display, a digital image with obstacle identification, and a depth map.

In some embodiments, the fused data may be used to combine object detection with a depth map, where proximity to the vehicle may be determined or discerned. As shown in FIG. 4, in one example, an object detection map may be colour coded (in this example with ring-shaped green, yellow, and red zones) to indicate an object's physical proximity to the vehicle. Alternatively, or in addition, an object's proximity may be indicated by a "time to collision" indicator, where the "time to collision" may be calculated from the vehicle's velocity and distance to the object.

Figure 1B:
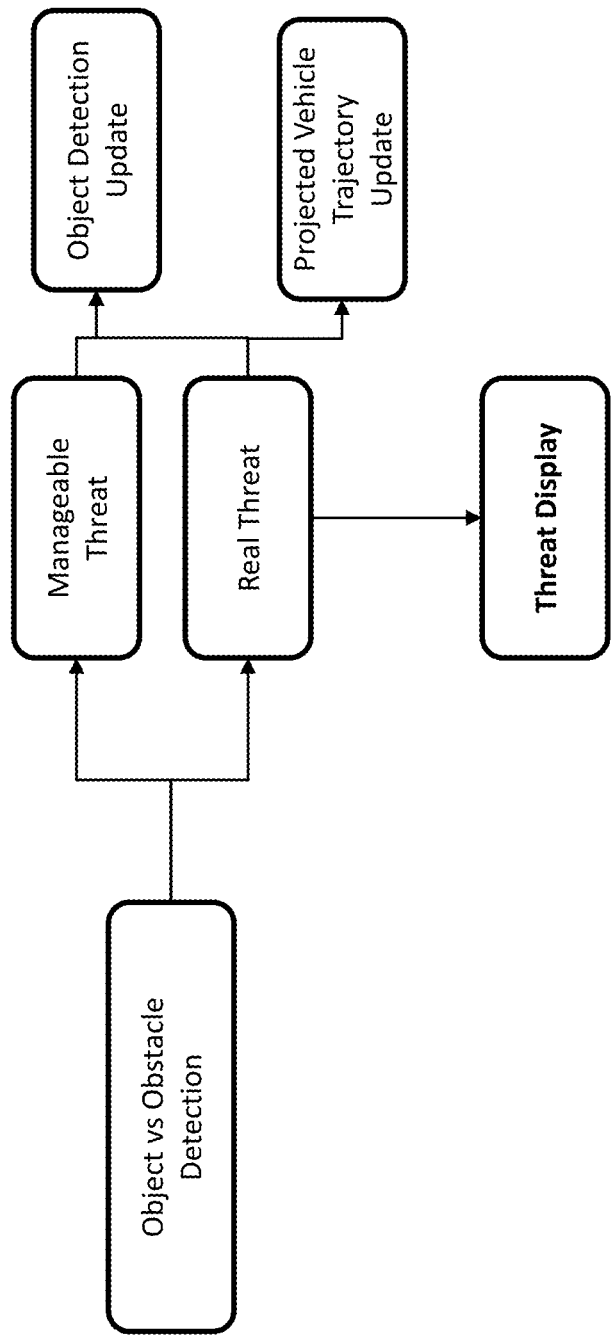
FIG. 1B shows a flowchart schematically depicting one embodiment of a threat assessment strategy in a vehicle guidance method.
Figure 1C:
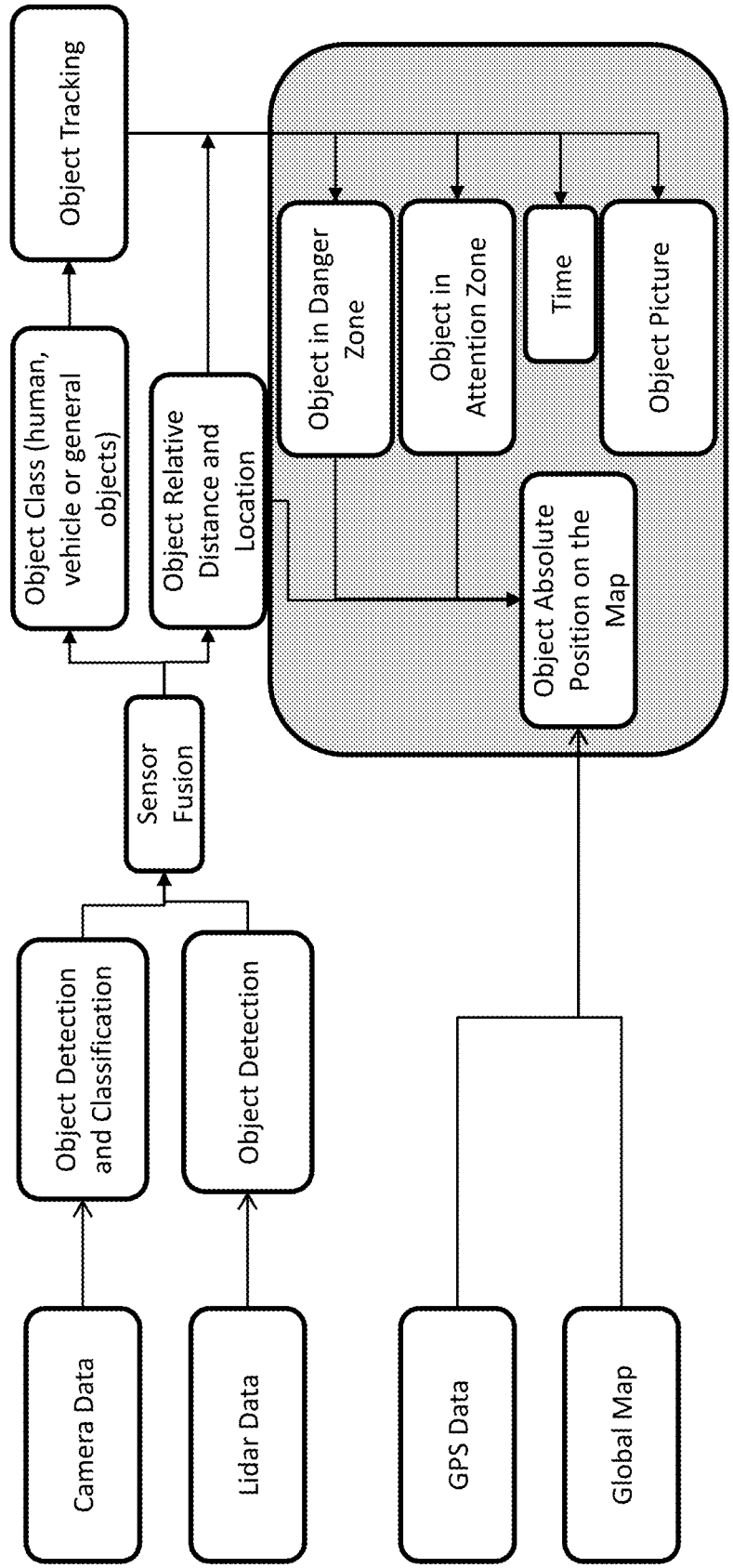
FIG. 1C shows a flowchart schematically depicting one embodiment of an object or obstacle reporting strategy in a vehicle guidance method.

Referring to FIG. 1B, in some embodiments, once an object has been detected and classified, the system may make a determination whether or not the object is a collision risk. The determination is based on the vehicle's predicted trajectory and the object's speed and direction of movement. If there is a possibility or probability of collision, for the purposes of this disclosure, the object will be considered to be an obstacle. If the object is considered an obstacle, then the system may further make a determination of a threat level—for example, whether the obstacle presents no threat, a manageable threat, or a real threat. The system may be programmed with various and user-managed levels of obstacle determination and threat recognition. For example, objects such as vegetation, precipitation or other minor objects may be treated as presenting no threat, or may be classified as objects which are not obstacles.

An obstacle such as a person or vehicle which is somewhat distant may be considered a manageable threat, and a notification may be provided to the vehicle operator of the obstacle presence.

A person or vehicle which is an obstacle in close proximity may be considered a real threat, and immediate action may be required. In this latter case, warning notifications may be presented, requiring an immediate stop or turn.

Therefore, in some embodiments, the system may categorize obstacles based on their distance and velocity as presenting no immediate threat (e.g., green zone of obstacle detection map in FIGS. 4 to 11), a possible threat (yellow zone of obstacle detection map in FIGS. 4 to 11), or a real threat (red zone of obstacle detection map in FIGS. 4 to 11).

In some embodiments, the system may be integrated into the vehicle's operating systems such that autonomous or automatic braking or turning may be implemented, based on the threat level, where human input is overridden.

In some embodiments, the system may be integrated into the vehicle's operating system of an excavator to speed up loading of a haul truck, based on the threat level.

In one example, as shown in FIG. 4, an object in the field-of-view is detected and classified as a person. The point cloud is processed to detect objects by clustering points into a plurality of clusters, each of which represents an object. In FIG. 4, the depth map is derived from the point cloud but clustering has not yet been performed. It is apparent that an object may be discerned from the point cloud.

In one example, as shown in FIG. 5, the fused data shows an obstacle, classified as a person. The depth map shows the relative close proximity such that the system reports the person as a real threat, in a red zone (or danger zone) of the obstacle detection map.

Figure 6:
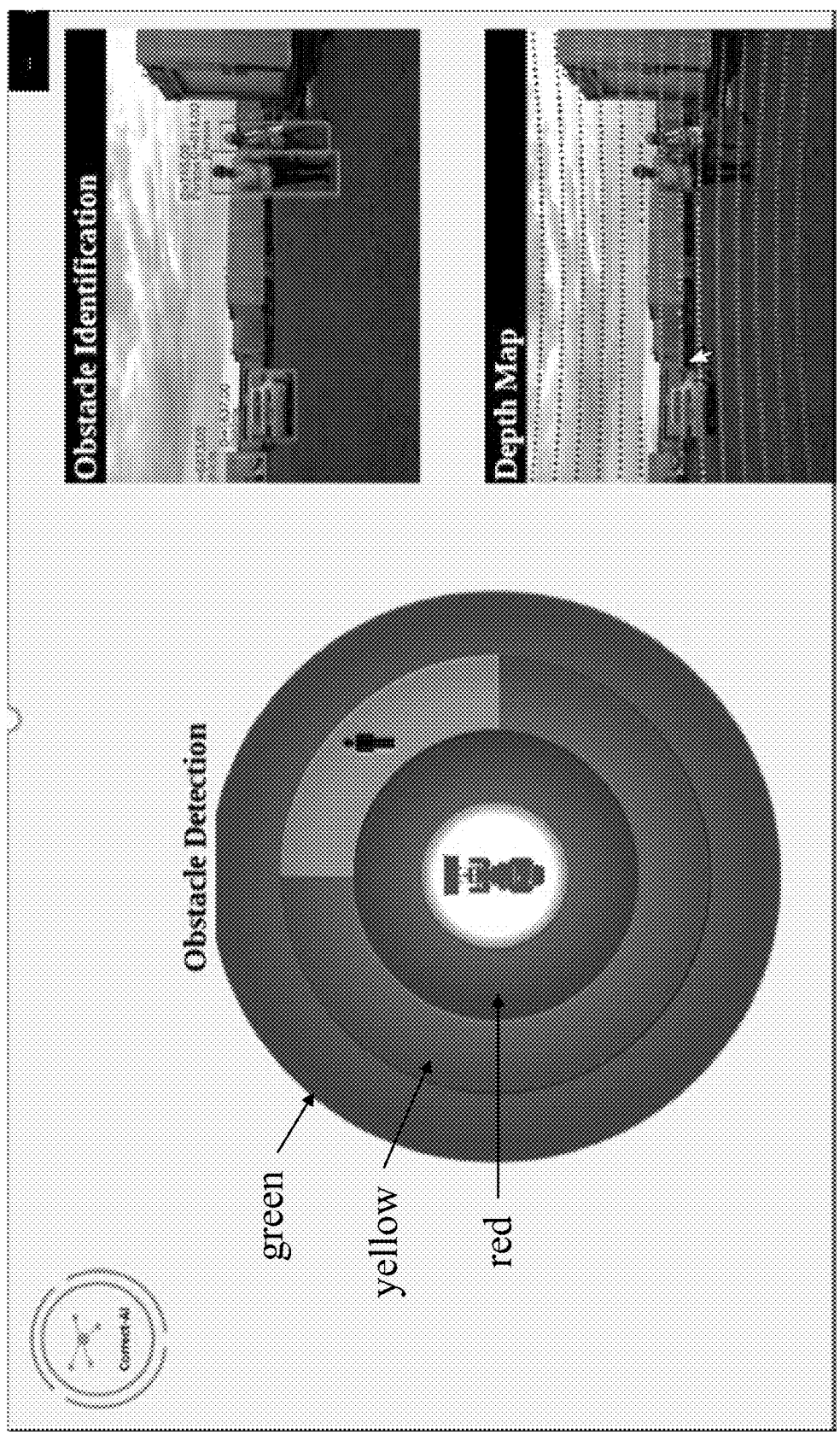
FIG. 6 shows a schematic depiction of a user display, a digital image with obstacle identification, and a depth map with two human obstacles and a distant vehicle.

In one example, as shown in FIG. 6, the fused data indicates that three objects were detected and classified, a distant vehicle and two closer people. In this example, no warning or notification is provided with respect to the distant vehicle, but the people in closer proximity are reported. As their distance exceeds a minimum threshold, the notification is only that of a yellow zone (or attention zone) in the obstacle detection map. Preferably, at any given situation, only the identified threat that is closest to the vehicle is reported.

Figure 7:
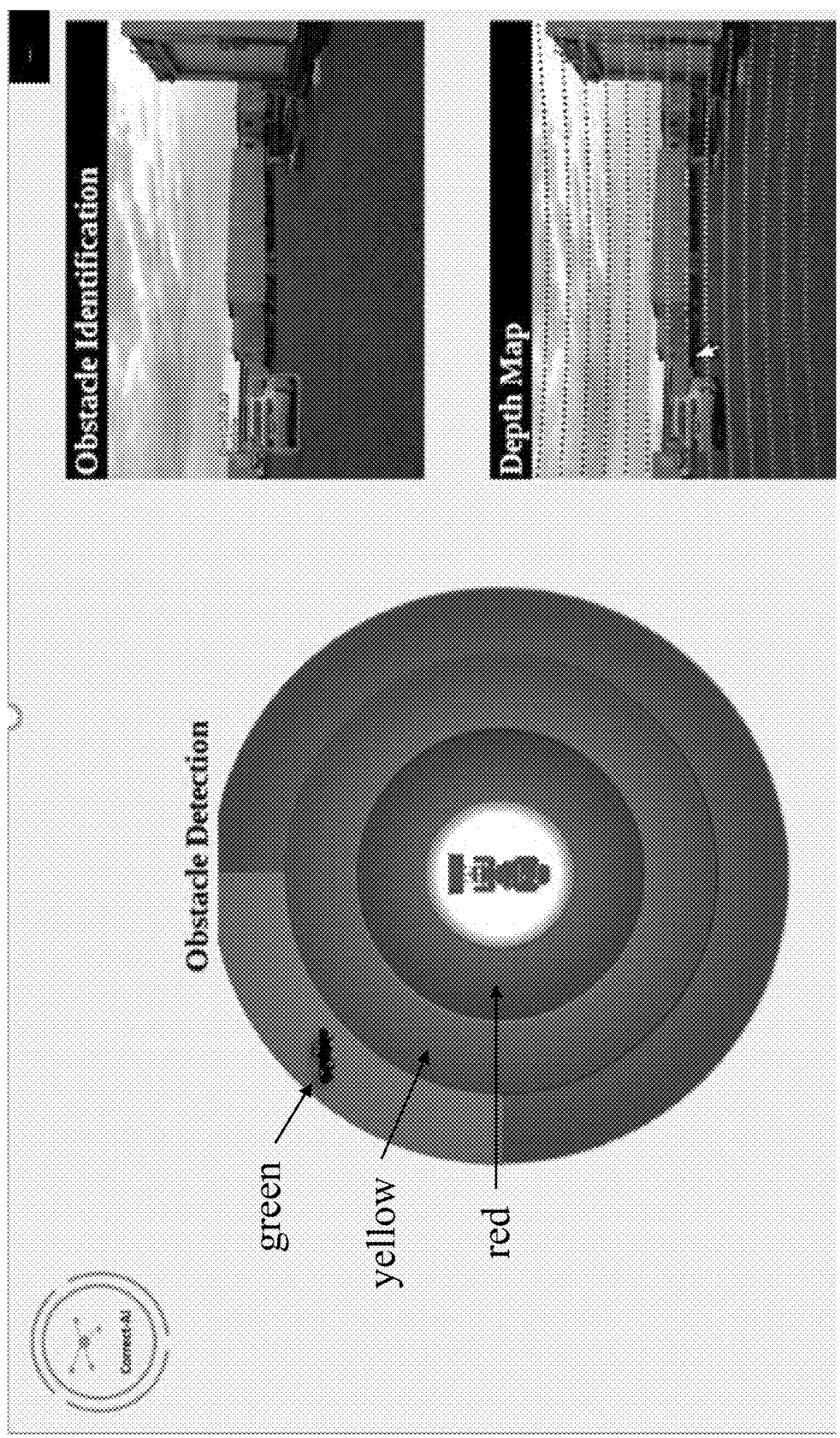
FIG. 7 shows a schematic depiction of a user display, a digital image with obstacle identification, and a depth map, with a distant vehicle.

In one example, as shown in FIG. 7, the same distant vehicle in FIG. 6 is present but the two people are absent. In this case, the vehicle is detected and classified, but because of its distance, as shown in the depth map, the system reports it as being in a green zone of the obstacle detection map.

Figure 8:
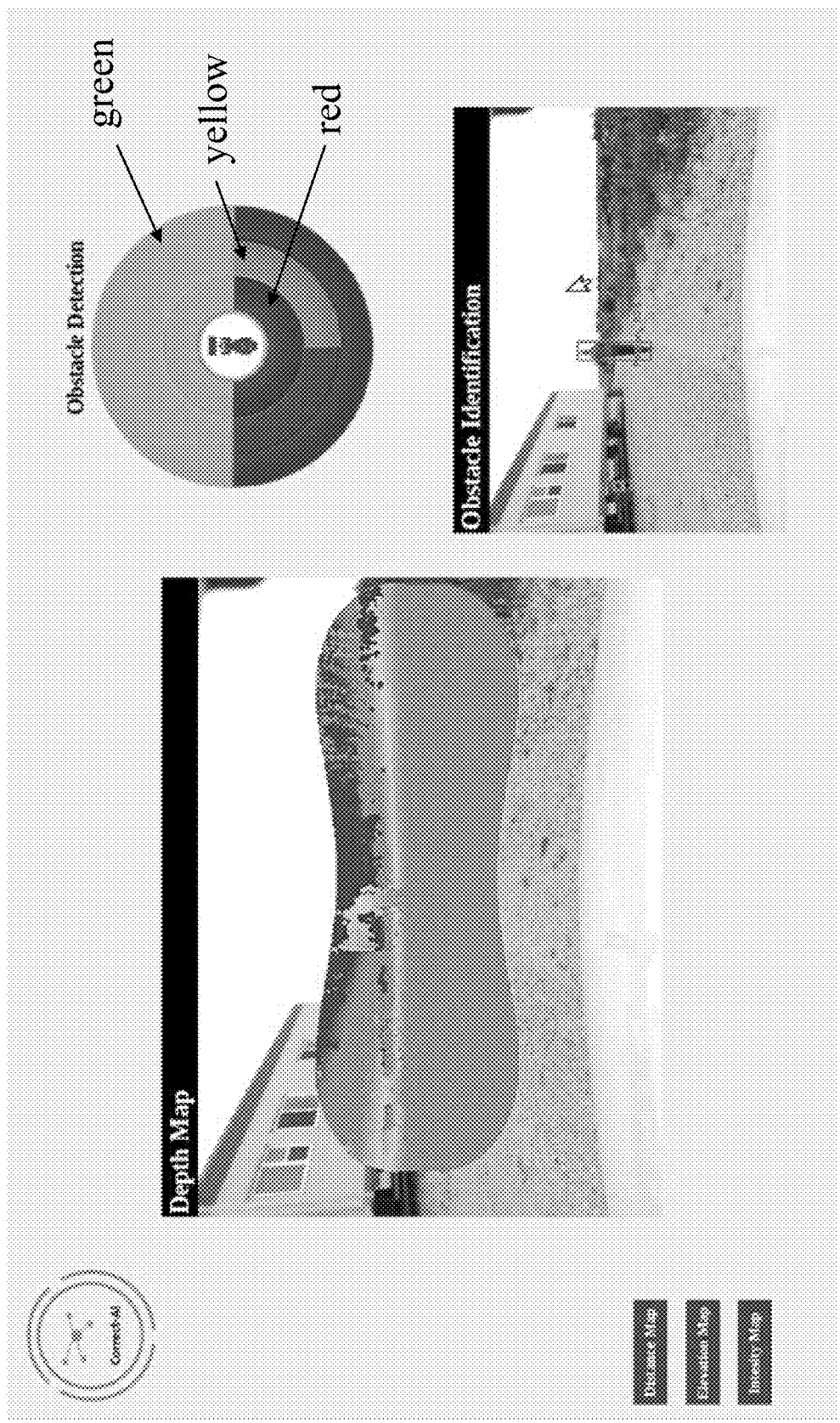
FIG. 8 is a depth map with fused lidar and camera data showing an obstacle, a user display and a digital image with obstacle identification.

FIG. 8 is a depth map with fused lidar and camera data showing an obstacle, in this case a human. Also shown is a user display showing an obstacle detection map, and a digital image with obstacle identification.

Figure 9:
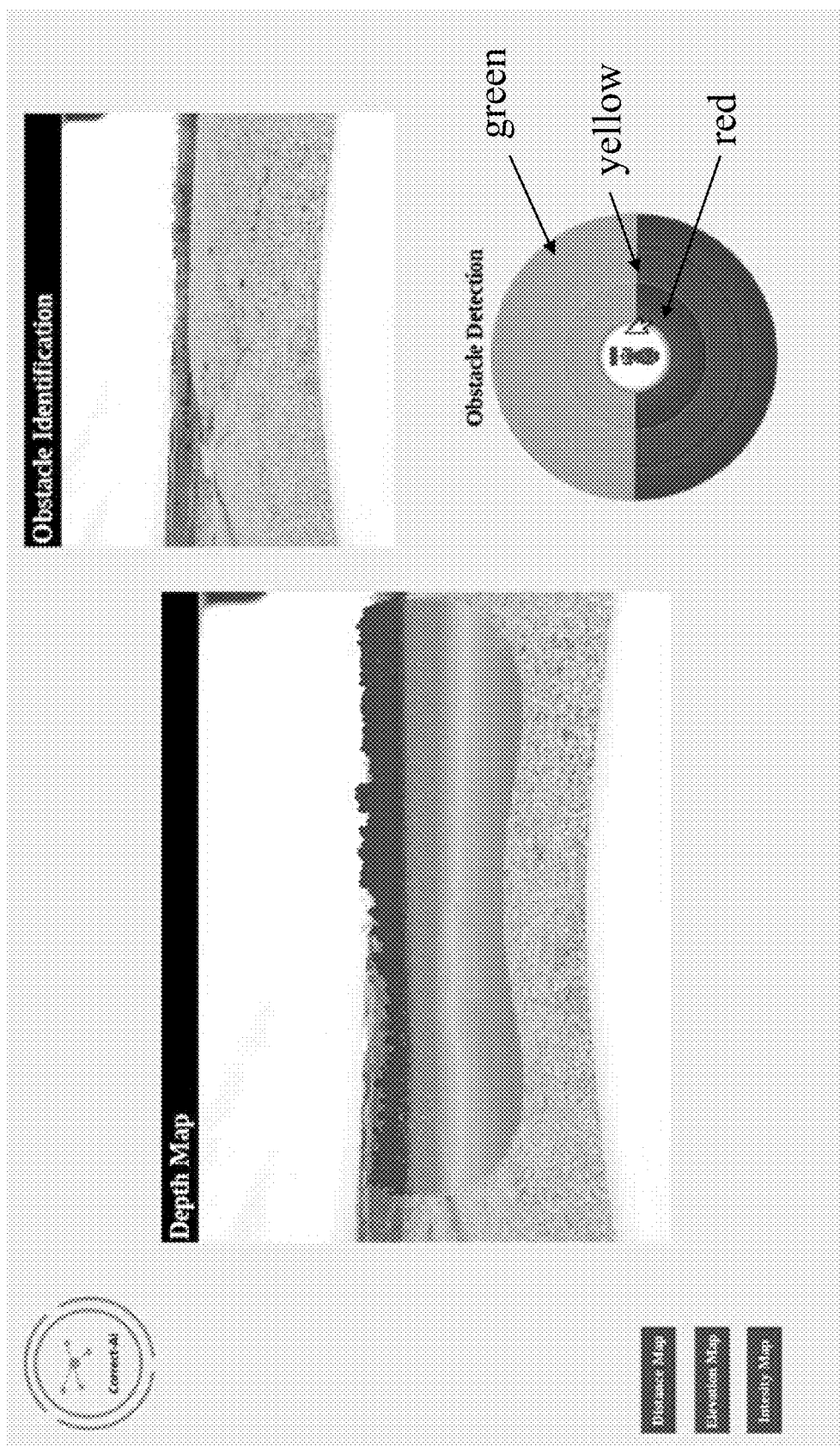
FIG. 9 is a depth map with fused lidar and camera data showing elevation, a user display and a digital image with obstacle identification.

FIG. 9 is a depth map with fused lidar and camera data showing elevation indicating the edge of the road, a user display with an obstacle detection map, and a digital image with obstacle identification.

Figure 10:
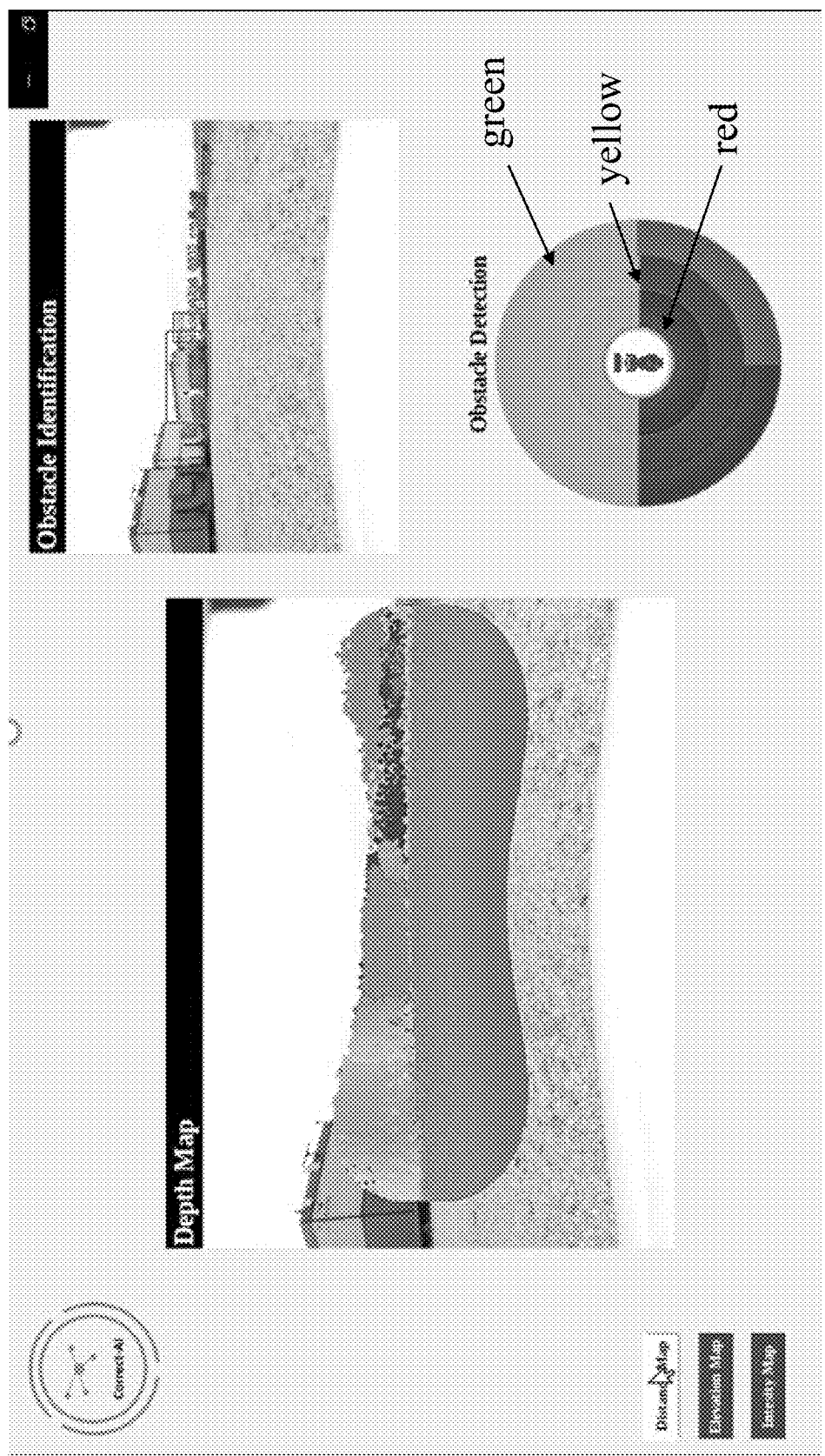
FIG. 10 is a depth map with fused lidar and camera data showing elevation and distant obstacles, a user display, and a digital image with obstacle identification.

FIG. 10 is a depth map with fused lidar and camera data showing elevation indicating the horizon and distant objects, a user display with an obstacle detection map, and a digital image with obstacle identification.

Figure 11:
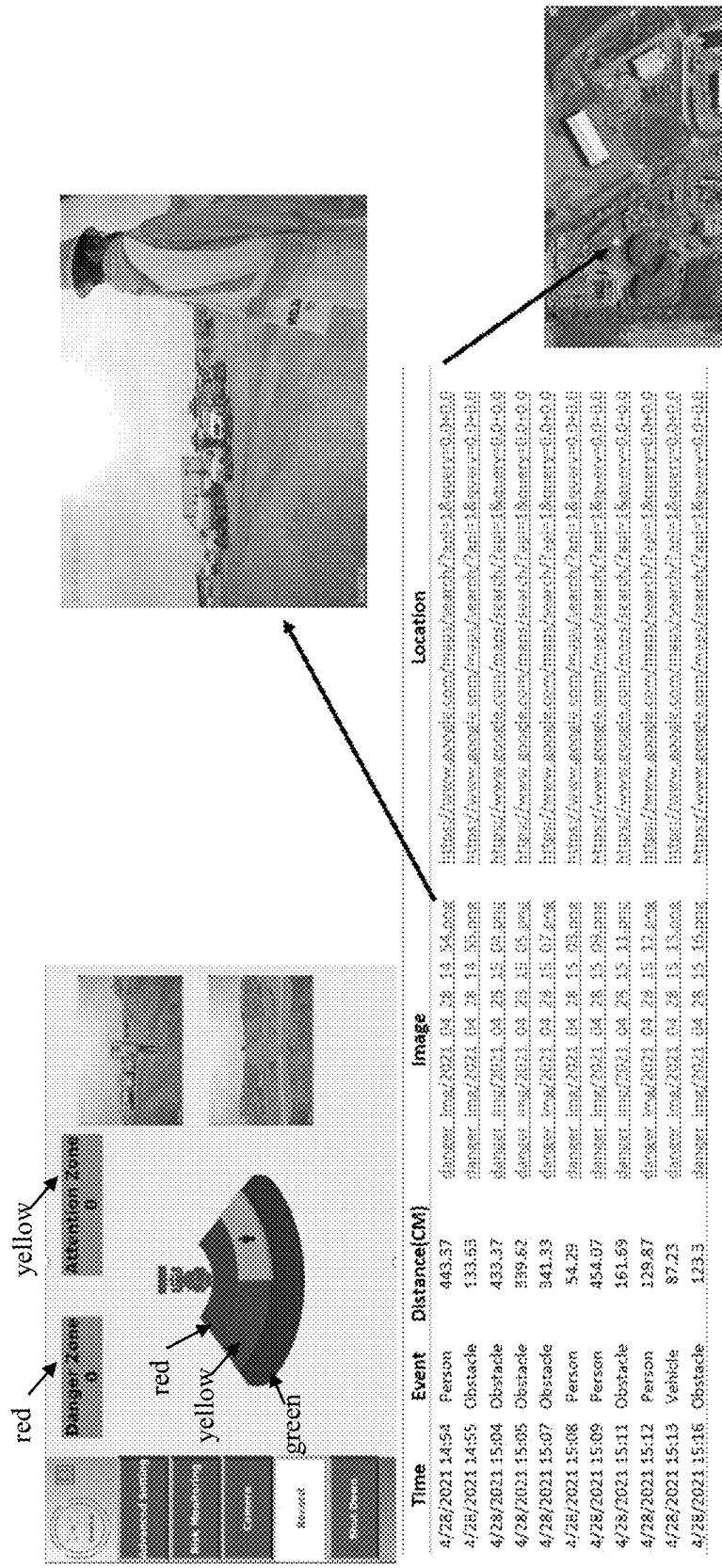
FIG. 11 shows a user display showing the report out from the recorded events in real time with a person in an "attention zone", and an event log with a corresponding image of the person and a map showing absolute position of the person at the relevant time.

In some embodiments, the system may comprise a component which logs object and obstacle determination events, as well as the associated threat level. As shown in FIG. 11, data representing the object absolute position (geolocation on a map) may be stored, and if the object is determined to be in an attention zone (yellow zone of obstacle detection map) or a danger zone (red zone of obstacle detection map), then an image of the object may be stored, and date and time-stamped and logged (under the heading "Time"). For each of those stamps, the data log indicates the type of detected object (under the heading "Event").

These data may then be reported to a user, in real-time or periodically, with a level of detailed information which may be configured by the user. For example, as shown in FIG. 11, the data log may be presented in a table format, with a date and time stamp, and the corresponding object determination event matched to hyperlinks to the stored digital images of the object (under the heading "Image") and an absolute location map (under the heading "Location") which shows the location of the vehicle and the object.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A visual guidance system for a vehicle in an environment, the system comprising:
    (a) an imaging system for producing a digital image of the environment;
    (b) a three-dimensional (3D) scanning system for producing digital point cloud data of the environment;
    (c) a system for monitoring the speed and direction of movement of the vehicle for generating data on the vehicle's speed and direction; and
    (d) at least one processor coupled to the imaging system, 3D scanning system and the system for monitoring the vehicle's speed and direction, the at least one processor being configured for:
        (i) processing the digital image to detect and classify target objects in the digital image, the target objects being one of a number of predefined object types requiring collision avoidance,
            wherein objects that are not of the predefined object types are not detected and classified during processing of the digital image, and the digital image includes at least one object not of the predefined object types;
        (ii) processing the digital point cloud data to group points into one or more point cloud groupings, each point cloud grouping representing a different object in the environment;
        (iii) determining point cloud groupings associated with each of the target objects,
            wherein the determination is based on identifying matching features between the digital point cloud values and the digital pixels for each of the target objects;
        (iv) generating a fused data set frame by fusing only the point cloud grouping associated with the target objects with the corresponding digital image of the target objects, to produce a fused data set associated with each target object;
        (v) determining each target object proximity from the vehicle based on the corresponding fused data set for that object in the fused data set frame;
        (vi) determining each target object speed and direction by comparison of the fused data set frame including that fused data of that object, to a previously generated fused data set frame including fused data of the same object;
        (vii) comparing each target objects' speed and direction to the vehicle's speed and direction to determine a likelihood of collision between the vehicle and each target object;
        (viii) if a determination is made of collision, then determining that a given target object is an obstacle, and,
            determining a threat level of the given target obstacle based on that object's speed and proximity from the vehicle;
            determining if the threat level exceeds a predetermined threshold; and
            generating an output if the threat level exceeds the predetermined threshold.

2. The system of claim 1, wherein the system for monitoring the speed and direction of the vehicle comprises an inertial measurement unit, and optionally a global navigation satellite system unit.

3. The system of claim 1, wherein the predefined object types include a person, another vehicle, or a structure such as a pipeline, building, or wellhead.

4. The system of claim 1, wherein the point cloud and/or the digital image is processed to determine elevation information in order to detect ground level and/or grade.

5. The system of claim 1, further comprising a user display which depicts the environment and any objects or obstacles within the environment.

6. The system of claim 1, wherein the output comprises the threat level of the obstacle displayed on a user display.

7. The system of claim 1, wherein the fused data set frame and the previous data set frame are produced at a data set frame rate of between about 10 Hz to about 1000 Hz.

8. The system of claim 1, comprising an incident logging/reporting component which records the detection of an object or obstacle, and periodically or continuously reports detection events to a remote user.

9. The system of claim 8 wherein the incident logging/reporting component stores the digital image of the object or the obstacle and/or an absolute position map, matched with the recorded detection of the object or obstacle, to be accessed by the remote user.

10. A method of guiding a vehicle in an environment, comprising:
    (a) processing a digital image of the environment to detect and classify target objects in the digital image, the target objects being one of a number of predefined object types requiring collision avoidance,
        wherein objects not of the predefined object types are not detected and classified during processing of the digital image and the digital image includes at least one object which is not of the predefined object type;
    (b) processing a point cloud data of the environment to group points into one or more point clouds, each point cloud grouping representing a different object in the environment;

(c) determining point cloud groupings associated with each of the target objects, wherein the determination is based on identifying matching features between the digital point cloud values and the digital pixels for each of the target objects;

(d) generating a fused data set frame by fusing only the point cloud grouping associated with the target objects with the corresponding digital image of the target objects, to produce a fused data set associated with each target object;

(e) determining each target object proximity from the vehicle based on the corresponding fused data set for that object in the fused data set frame;

(f) determining each target object speed and direction by comparison of the fused data set frame including fused data of that object, to a previously generated fused data frame including fused data of the same object;

(g) comparing each target object's speed and direction to the vehicle's speed and direction to determine a likelihood of collision between the vehicle and each target object;

(h) if a determination is made of collision, then determining that a given object is an obstacle, and, determining a threat level of the given target obstacle based on that object's speed and proximity from the vehicle;

determining if the threat level exceeds a predetermined threshold; and generating an output if the threat level exceeds the predetermined threshold.

11. The method of claim 10 comprising the further step of reporting the threat level of the obstacle, if any, to a vehicle operator, and/or recording the threat level of the obstacle, if any to a data log.

12. The method of claim 11 wherein the data log further comprises one or more of:
   (a) a date and time stamp;
   (b) a type of the obstacle;
   (c) a distance of the obstacle to the vehicle;
   (d) a vehicle location; and
   (e) the digital image.

13. The method of claim 10 further comprising the step of determining elevation information in order to detect ground level and/or grade.

14. The method of claim 10 further comprising the step of displaying the environment and any objects or obstacles within the environment to a user.

15. The method of claim 14 wherein the threat level of any object or obstacle is displayed.

16. The method of claim 10 wherein the fused data set frame and the previous data set frame are produced at a data set frame rate of between about 10 Hz to about 1000 Hz.

17. The system of claim 1, wherein the system is integrated into the operating system of an excavator and the output comprises automatically controlling an excavator to speed up loading of a haul truck based on the threat level.

18. The method of claim 10, wherein the output comprises automatically controlling an excavator to speed up loading of a haul truck based on the threat level.

* * * * *